Patented Mar. 28, 1944

2,345,215

UNITED STATES PATENT OFFICE 2,345,215

MANUFACTURE OF PYRIMIDINE CONDENSATION PRODUCTS

Robert Purrmann, Munich, Germany, assignor to Winthrop Chemical Company, Inc., New York, N. Y., a corporation of New York No Drawing. Application February 5, 1941, Serial No. 377,515. In Germany February 29, 1940

12 Claims. (Cl. 260—251)

This invention relates to a new process of manufacturing condensation products; more particularly it relates to a process of manufacturing pyrimidino - 2.3 - dihydroxypyrazine compounds which are like or similar to leucopterine.

It is known that 3-methyl-2.6-dihydroxy-4-amino-5-oxalylaminopyrimidine is obtained when reacting upon 3-methyl-2.6-dihydroxy-4.5-diaminopyrimidine with oxalic acid at a temperature of 160 to 170° C.; by heating the disodium compound of the said reaction product to 150 to 260° C. it has been converted into the disodium salt of 3-methylxanthine-8-carboxylic acid according to the following reaction scheme:

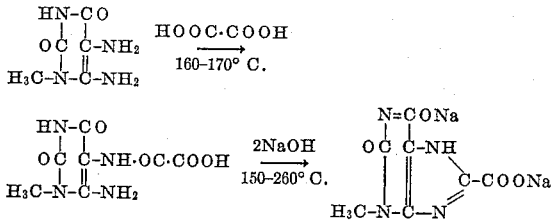

In accordance with the present invention pyrimidino-2.3-dihydroxypyrazines are directly obtained when reacting upon a 4.5-diaminopyrimidine with oxalic acid at higher temperatures, that is, higher than about 200° C. Preferably the condensation is effected at temperatures from about 240° C. to about 280° C. Still higher temperatures may be employed, say, up to about 350° C., but such higher temperatures do not offer any advantage; on the contrary, such high temperatures are not so far from the decomposition temperature of the condensation products at about 400° C.

The reaction in this case performs in accordance with the following formulae:

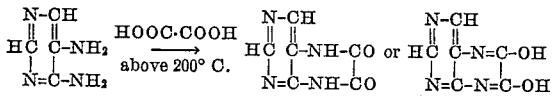

The reaction products may also be designated as 8.9-dihydroxy-azinepurines.

The new process has proved generally operable with 4.5-diaminopyrimidine and its nuclear substitution products, such as hydroxy-, amino- and alkyl-substitution products. When reacting, for instance, 2.4.5-triamino - 6 - hydroxypyrimidine with oxalic acid, a product identical with leucopterine which is the main pigment substance of the cabbage-butterfly is obtained in accordance with the following reaction scheme:

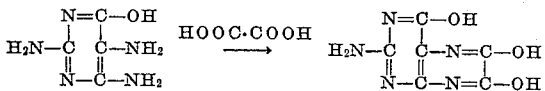

Other products similar to leucopterine have been obtained in an analogous manner.

The new process, therefore, is of most interest in the manufacture of the biologically important products of the pterine series.

The invention is furthermore illustrated by the following examples without, however, being restricted thereto:

Example 1

100 milligrams of pure 2.4.5-triamino-6-hydroxy-pyrimidine are triturated with 0.5 gram of crystallized oxalic acid. The mixture is then heated in an oil bath in a small retort. Water of crystallization and reaction is repeatedly removed by slightly diminished pressure, while the temperature is raised to 260° C. within one hour and is kept at this point for about 20 minutes. The reaction product dissolves in 2 ccs. of 2 normal sodium hydroxide solution and 50 ccs. of water to a yellowish solution. After the solution has been decolorated by animal charcoal, it is added drop by drop, while boiling, to 30 ccs. of boiling 2 normal hydrochloric acid. 125 milligrams of finely crystallized leucopterine are thus obtained. It has exactly the same properties as the leucopterine obtained from cabbage-butterfles or by reduction of xanthopterine.

Example 2

200 milligrams of 2.6-di-hydroxy-4.5-diamino-pyrimidine are triturated with 1.5 grams of oxalic acid and the mixture is slowly heated to 260° C. in an oil bath under slightly diminished pressure. The residue is dissolved in a few cubic centimeters of dilute potassium hydroxide solution. The solution is filtered, the filtrate is diluted to 25 ccs. and added drop by drop, while boiling, to 20 ccs. of boiling 2 normal hydrochloric acid. The still hot solution is filtered. 172 milligrams of desimino-leucopterine separate from the solution. For further purification the reaction product is reprecipitated as before, if necessary, while decolorating the alkaline solution with animal charcoal.

Example 3

1 gram of 3-methyl-4.5-diamino-2.6-di-hydroxy-pyrimidine is triturated with 7 grams of oxalic acid and slowly heated to 240° C. under slightly diminished pressure. The residue is dissolved in a few cubic centimeters of dilute sodium hydroxide solution. The solution is diluted with 100 ccs. of water, decolorated with animal charcoal and the reaction product is precipitated from the solution with 20 ccs. of 2 normal hydrochloric acid, while still hot. The 3-methyl-desimino-leucopterine is thus obtained in colorless leaflets.

I claim:

1. The process which comprises condensing a 4.5-diamino-pyrimidine with oxalic acid at a temperature of about 200 to about 350° C.

2. The process which comprises condensing a 4.5-diamino-pyrimidine with oxalic acid at a temperature of about 200 to about 350° C. while sucking off the water split off during the condensation by diminished pressure.

3. The process which comprises condensing a 4.5-diamino-pyrimidine with oxalic acid at a temperature of about 240 to about 280° C.

4. The process which comprises condensing a 4.5-diamino-pyrimidine with oxalic acid at a temperature of about 240 to about 280° C. while sucking off the water split off during the condensation by diminished pressure.

5. The process which comprises condensing a hydroxy-4.5-diaminopyrimidine with oxalic acid at a temperature of about 200 to about 350° C.

6. The process which comprises condensing a hydroxy-4.5-diaminopyrimidine with oxalic acid at a temperature of about 200 to about 350° C. while sucking off the water split off during the condensation by diminished pressure.

7. The process which comprises condensing a hydroxy-4.5-diaminopyrimidine with oxalic acid at a temperature of about 240 to about 280° C.

8. The process which comprises condensing a hydroxy-4.5-diaminopyrimidine with oxalic acid at a temperature of about 240 to about 280° C. while sucking off the water split off during the condensation by diminished pressure.

9. The process which comprises condensing 2.4.5-triamino-6-hydroxypyrimidine with oxalic acid at a temperature of about 200 to about 350° C.

10. The process which comprises condensing 2.4.5-triamino-6-hydroxypyrimidine with oxalic acid at a temperature of about 200 to about 350° C. while sucking off the water split off during the condensation by diminished pressure.

11. The process which comprises condensing 2.4.5-triamino-6-hydroxypyrimidine with oxalic acid at a temperature of about 240 to about 280° C.

12. The process which comprises condensing 2.4.5-triamino-6-hydroxypyrimidine with oxalic acid at a temperature of about 240 to about 280° C. while sucking off the water split off during the condensation by diminished pressure.

ROBERT PURRMANN.